(12) United States Patent
Gualtieri

(10) Patent No.: US 7,767,072 B2
(45) Date of Patent: Aug. 3, 2010

(54) METHOD OF FORMING YTTRIUM-MODIFIED PLATINUM ALUMINIDE DIFFUSION COATING

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 900 days.

(21) Appl. No.: 11/639,684

(22) Filed: Dec. 15, 2006

(65) Prior Publication Data

US 2008/0142371 A1 Jun. 19, 2008

(51) Int. Cl.
C25D 3/00 (2006.01)
(52) U.S. Cl. .................. 205/261; 205/220; 205/224; 205/228; 205/255
(58) Field of Classification Search .................. 205/261, 205/228
See application file for complete search history.

(56) References Cited

U.S. PATENT DOCUMENTS

| | | | | |
|---|---|---|---|---|
| 3,979,273 | A * | 9/1976 | Panzera et al. | 204/192.15 |
| 5,514,482 | A | 5/1996 | Strangman | |
| 5,981,091 | A | 11/1999 | Rickerby et al. | |
| 6,183,888 | B1 | 2/2001 | Alperine et al. | |
| 6,458,473 | B1 | 10/2002 | Conner et al. | |
| 6,969,558 | B2 | 11/2005 | Walston et al. | |
| 2002/0048683 | A1 | 4/2002 | Walston et al. | |
| 2002/0132132 | A1 | 9/2002 | Bose et al. | |
| 2005/0145503 | A1 * | 7/2005 | Kozlov et al. | 205/255 |
| 2006/0046091 | A1 | 3/2006 | Madhava et al. | |

OTHER PUBLICATIONS

Kumbhar et al., "Electrodeposition of Yttrium from a Nonaqueous Bath" Metal Finishing 93(4) pp. 28-31 (Apr. 1995).*
International Search Report for International Application Serial No. PCT/US2007/087125, mailed Feb. 12, 2009.
P. P. Kumbhar, C.D. Lokhande, "Electrodeposition of Yttrium from a Nonaqueous Bath"; Metal Finishing, vol. 93, No. 4, Apr. 1995, pp. 28-31, XP002511174, p. 28, table 1.
R. Siab et al., "Deposition of Yttrium-Based Thin Films on TA6V Allow Substrates"; Applied Surface Science, vol. 236, Sep. 15, 2004, pp. 50-56, XP002511175, p. 51, left-hand column.
P.P. Kumbhar, C.D. Lokhande, Electrodeposition of Yttrium From a Nonaqueous Bath, Metal Finishing, Apr. 1995, pp. 28-31, Elsevier Science Inc.

* cited by examiner

*Primary Examiner*—Harry D Wilkins, III
*Assistant Examiner*—Bryan D. Ripa
(74) *Attorney, Agent, or Firm*—Ingrassia Fisher & Lorenz, P.C.

(57) ABSTRACT

A method for forming a modified platinum aluminide coating on a turbine engine component surface includes the step of forming a platinum layer on the turbine engine component surface. A bath is then prepared, including a mixture of a primary alcohol and a tertiary alcohol, and an electrolyte including an yttrium salt. Then, yttrium from the yttrium salt is electrodeposited onto the platinum layer. The component is heated to diffuse the yttrium into the platinum layer to form a modified platinum layer. Aluminum is then deposited onto the modified platinum layer, and the component is heated to diffuse the aluminum into the modified platinum layer to form a modified platinum aluminide layer.

20 Claims, 4 Drawing Sheets

METHOD OF FORMING YTTRIUM-MODIFIED PLATINUM ALUMINIDE DIFFUSION COATING

TECHNICAL FIELD

The present invention relates to methods for platinum and aluminum deposition to form a platinum aluminide coating on a substrate and, more particularly, to methods for forming platinum aluminide coatings that include modifying elements.

BACKGROUND

Turbine engines are used as the primary power source for various aircraft applications. Most turbine engines generally follow the same basic power generation process. Compressed air is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more ambient air into the engine and the high velocity combustion gas is passed out of the gas turbine aft end to create forward thrust. Other engines use this power to turn one or more propellers, electrical generators, or other devices.

Since turbine engines provide power for many primary and secondary functions, it is important to optimize both the engine service life and the operating efficiency. Although hotter combustion gases typically produce more efficient engine operation, the high temperatures create an environment that promotes oxidation and corrosion. For this reason, diverse coatings and coating methods have been developed to increase the operating temperature limits and service lives of the high pressure turbine components, including the turbine blade and vane airfoils.

One category of conventional airfoil coatings includes platinum aluminide coatings. These coatings may be applied onto surfaces of turbine blades, vanes, and other components to protect against oxidation and corrosion attack. Platinum aluminide coatings provide protection as a result of selective oxidation of aluminum to form an alumina ($Al_2O_3$) scale that grows very slowly at high temperatures by a diffusion process. One method for applying a platinum aluminide coating includes depositing aluminum and platinum onto the component substrate. Modification of the platinum aluminide alloy with other elements such as silicon, hafnium, and yttrium, sometimes referred to as "active elements," enhances the alloy's corrosion resistance properties. However, many active elements rapidly oxidize, and it is advantageous to incorporate such elements in their elemental form in order to provide adequate oxidation protection. Further, there are some inherent difficulties in providing an adequate distribution of active elements in a platinum aluminide diffusion coating.

There is a need for platinum aluminide coatings that have active elements adequately distributed therein. There is also a need for methods of forming such coatings in an atmosphere in which oxidation of the platinum, aluminum, or any active elements is prevented.

BRIEF SUMMARY

One embodiment of the present invention provides a method for forming an yttrium coating on a metal substrate. First, a bath is prepared that includes a mixture of a primary alcohol and a tertiary alcohol, and an electrolyte including an yttrium salt. Then, yttrium from the yttrium salt is electrodeposited onto the metal substrate.

Another embodiment of the present invention provides a method for forming a modified platinum aluminide coating on a turbine engine component surface. A platinum layer is formed onto the turbine engine component surface. A bath is then prepared, including a mixture of a primary alcohol and a tertiary alcohol, and an electrolyte including an yttrium salt. Then, yttrium from the yttrium salt is electrodeposited onto the platinum layer. The component is heated to diffuse the yttrium into the platinum layer to form a modified platinum layer. Aluminum is then deposited onto the modified platinum layer, and the component is heated to diffuse the aluminum into the modified platinum layer to form a modified platinum aluminide layer.

Other independent features and advantages of the preferred methods will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention includes methods for producing corrosion resistance metal coatings, such as platinum aluminide coatings, for components that are used in high temperature applications. The coatings include an active element such as yttrium in its elemental form in order to provide adequate oxidation protection. Further, the method of forming the corrosion resistance coating enables thorough diffusion and distribution of the active element throughout the diffusion coating.

Figure 1:
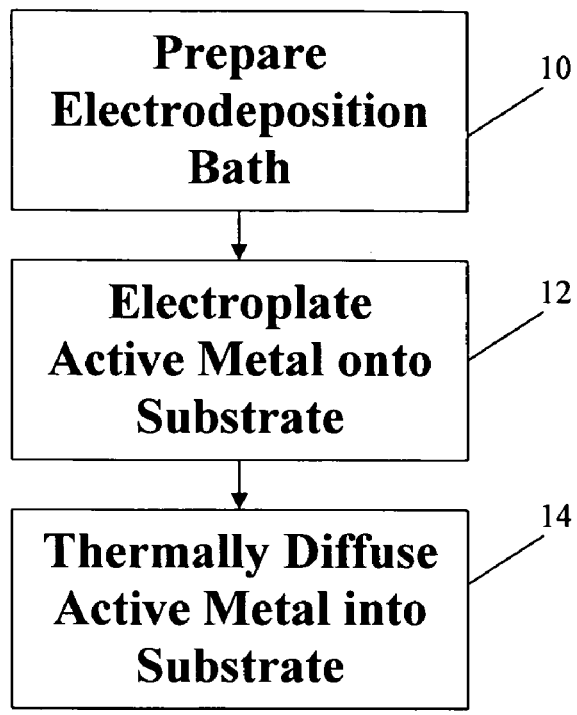
FIG. 1 is a flow chart outlining a method for forming an yttrium coating on a metal substrate according to an embodiment of the invention.

Turning to FIG. 1, a flow diagram outlines a method for forming a layer of an active element such as yttrium on a metal substrate. The active element layer is subsequently diffused into the metal substrate to form a corrosion resistance coating. Some exemplary high-temperature components that benefit from the coating include turbine engine components such as turbine blades and stators. Such components are commonly made from a superalloy such as a nickel, iron, or cobalt-based metal, to name just a few generic examples. According to an exemplary method, the component to be coated with the corrosion resistance material has a previously-deposited layer of pure platinum or a platinum-containing alloy on which the active element is electrodeposited.

An electrolyte bath is first prepared as step 10. The bath solvent includes a mixture of primary alcohol and a tertiary alcohol, and further includes an electrolyte such as an yttrium salt. Alcohols are used as a solvent instead of an aqueous solution for electrodeposition of the active element layer. In an exemplary electrodeposition method, the electrolyte bath is substantially or entirely non-aqueous. Furthermore, excellent active element layers are formed when the entire solvent composition in the electrolyte bath consists of a mixture of a primary and a tertiary alcohol. Exemplary primary alcohols in the electrolyte bath include methanol and ethanol, and an exemplary tertiary alcohol is alpha terpineol. Effective electrodeposition of yttrium is obtained using pure ethanol as a primary alcohol, although denatured ethanol that includes some methanol (i.e. 5% methanol) is also suitable.

The electrolyte bath for the electrodeposition process has a substantial tertiary alcohol component. For example, the tertiary alcohol may be included at a concentration ranging between 20 and 80 percent of the total solvent volume, with the substantial remainder of the total solvent weight being a primary alcohol. An exemplary electrolyte solvent is a tertiary alcohol and a primary alcohol at about a 1:1 volume ratio.

The electrolyte in the bath includes a salt of the active element to be electro-deposited onto a component substrate. Metal nitrates are one class of electrolyte solutes, and are particularly effective when yttriuim is the active metal to be electro-deposited. An exemplary electrolyte solute includes $Y(NO_3).3H_2O$, which is a dehydration product obtainable by roasting $Y(NO_3).6H_2O$ at a suitable temperature (i.e. 100° C.) to remove three waters of hydration. The electrolyte is included in the bath solution at least at a 10 mM concentration, and preferably at least at a 100 mM concentration, and more preferably at least at a 200 mM concentration.

A buffer may also be included in the electrolyte bath as necessary. An exemplary buffer is sodium acetate. However, sodium acetate is commonly obtained in a hydrated form, typically with three waters of hydration per molecule of sodium acetate. According to an exemplary method, sodium acetate is dehydrated by heating above 123° C. to form anhydrous sodium acetate before adding the buffer to the electrolyte bath. Sodium acetate may be included in the bath at a 5 to 20 mM concentration, and is preferably included at about a 10 mM concentration.

Returning to the method outlined in FIG. 1, after preparing the electrodeposition bath the active element is electrodeposited onto the component substrate as step 12. Prior to deposition, the component being coated with yttrium or another active element may be prepared by masking areas on which a coating is undesirable. The masking material may be any conventional masking substance that is compatible with the alcohol bath. The component may also undergo sufficient cleaning using a suitable solvent such as methanol. During electrodeposition, the component being coated with the active metal functions as an electrode in the bath, typically the cathode, by attaching electrical leads to a non-insulated portion of the component surface.

In order to prevent oxidation of the component surface, or oxidation of the active metal being electrodeposited onto the surface, the bath is placed in a controlled and substantially oxygen-free environment during the electrodeposition process. For example, an inert gas may be blown over the bath, or the bath may be placed into a chamber of the inert gas. Suitable inert gases include dry nitrogen and argon. An exemplary electrodeposition process is performed at an ambient temperature ranging between about 0 and about 50° C., with a narrower exemplary range being between about 20 and about 25° C.

Electrical parameters for electrodeposition of the active material onto the component substrate may be adjusted depending on factors such as the desired coating thickness and the substrate composition. According to an exemplary embodiment, a current of about 2 mA per square inch of component surface area to be coated is applied during electrodeposition, and is maintained for about an hour.

After electrodepositing the active metal, the component is heat annealed to thermally diffuse the active metal into the underlying component surface. Since yttrium readily oxidizes at room temperature, a brazing adhesive may be used as an oxidation protective coating over the active metal prior to heat annealing the component. If a brazing adhesive or other oxidation protection coating is used, the coating should be selected that will readily vaporize below the diffusion temperature so the coating material does not contaminate the diffusion coating. Furthermore, an exemplary thermal diffusion method is performed under vacuum pressure in order to remove oxygen from the annealing environment.

For thorough diffusion and distribution of the active metal, a diffusion temperature should be selected taking into consideration any eutectic points between the active metal and the underlying substrate. For example, a phase diagram for platinum-yttrium reveals a eutectic at platinum-rich concentrations at 1550° C. For this reason, in an exemplary method in which yttrium is diffused into a platinum layer, thermal diffusion is performed at a temperature well below 1550° C. According to one exemplary method, thermal diffusion of yttrium into platinum is performed in a vacuum by maintaining a temperature of about 1065° C. for about four hours.

Figure 3:
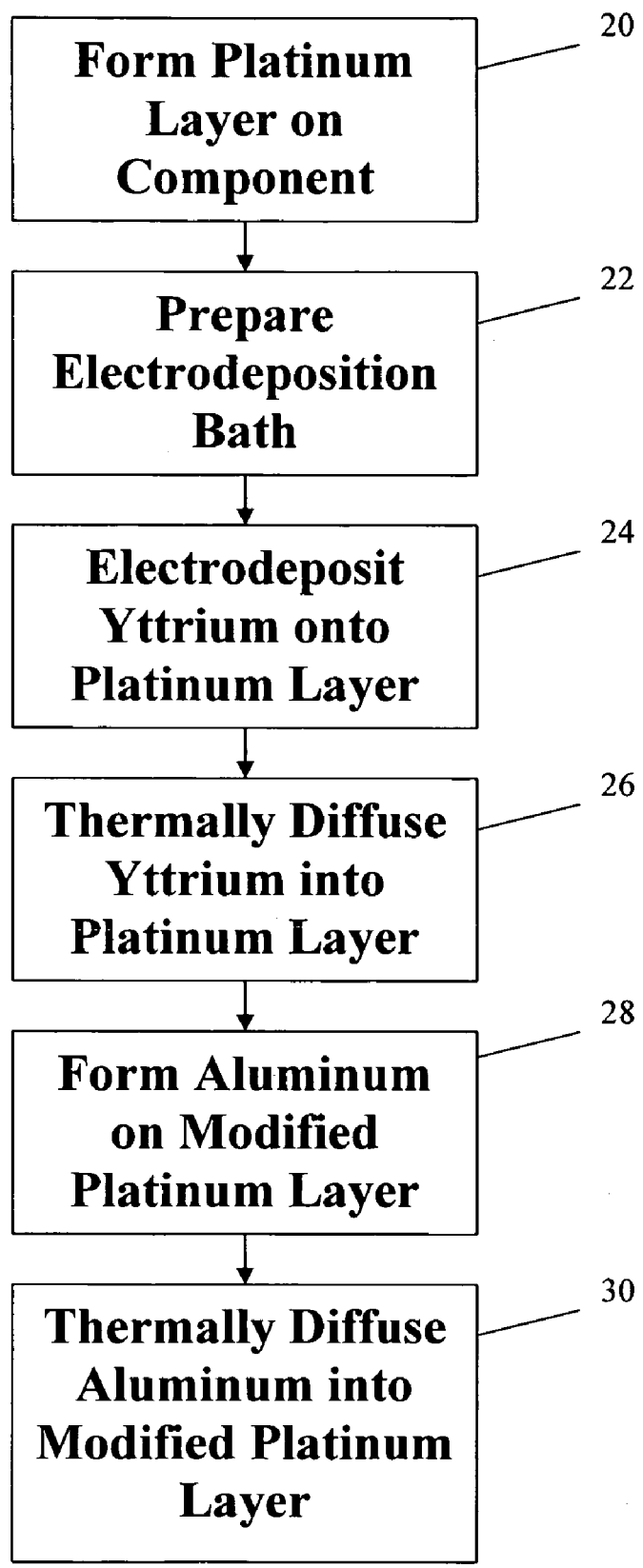
FIG. 3 is a flow chart outlining a method for forming a modified platinum aluminide coating on a metal substrate according to an embodiment of the invention.
Figure 4:
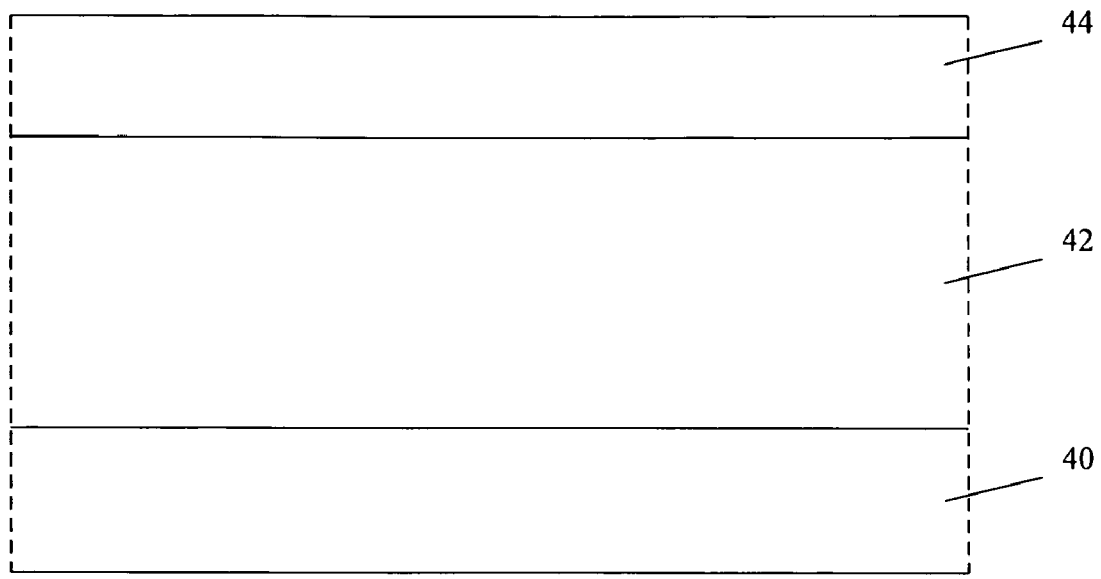
FIGS. 4 to 7 are cross-sectional views depicting a substrate having a modified platinum aluminide coating formed thereon according to the method outlined in FIG. 3.
Figure 5:
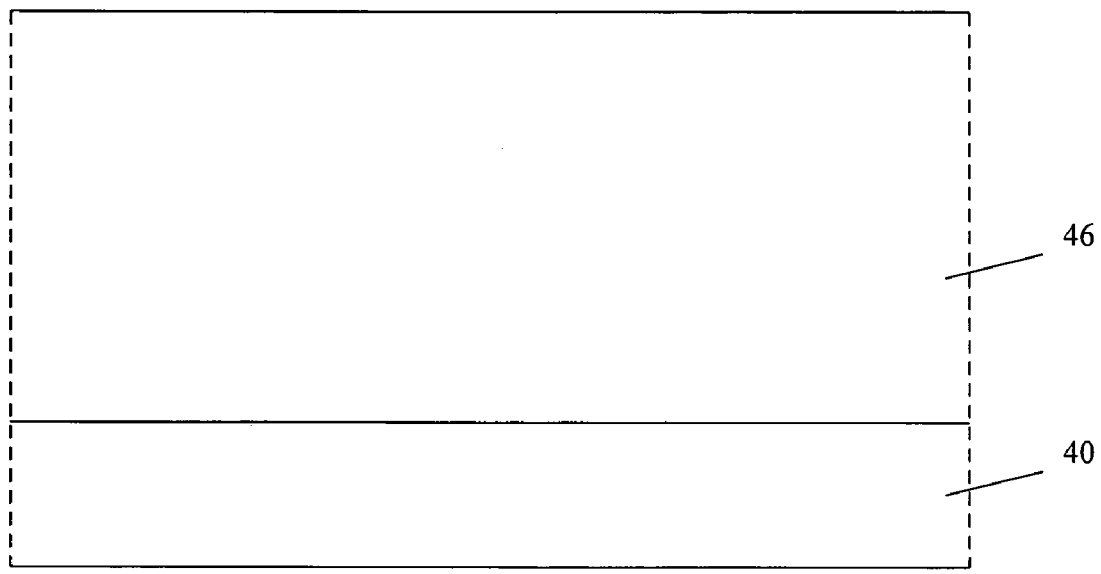
Figure 6:
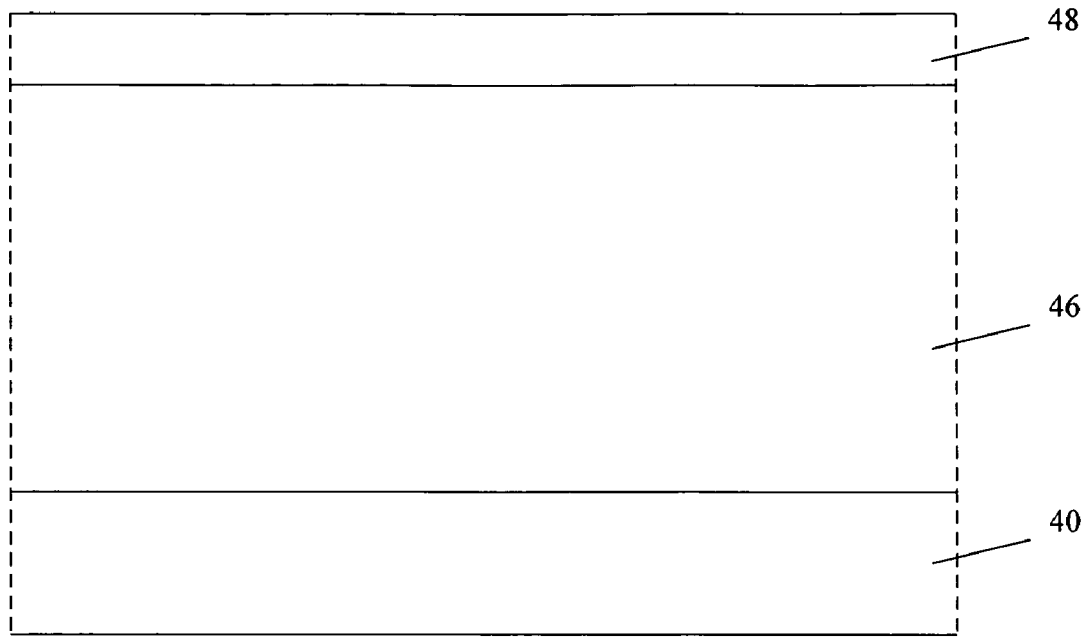
Figure 7:
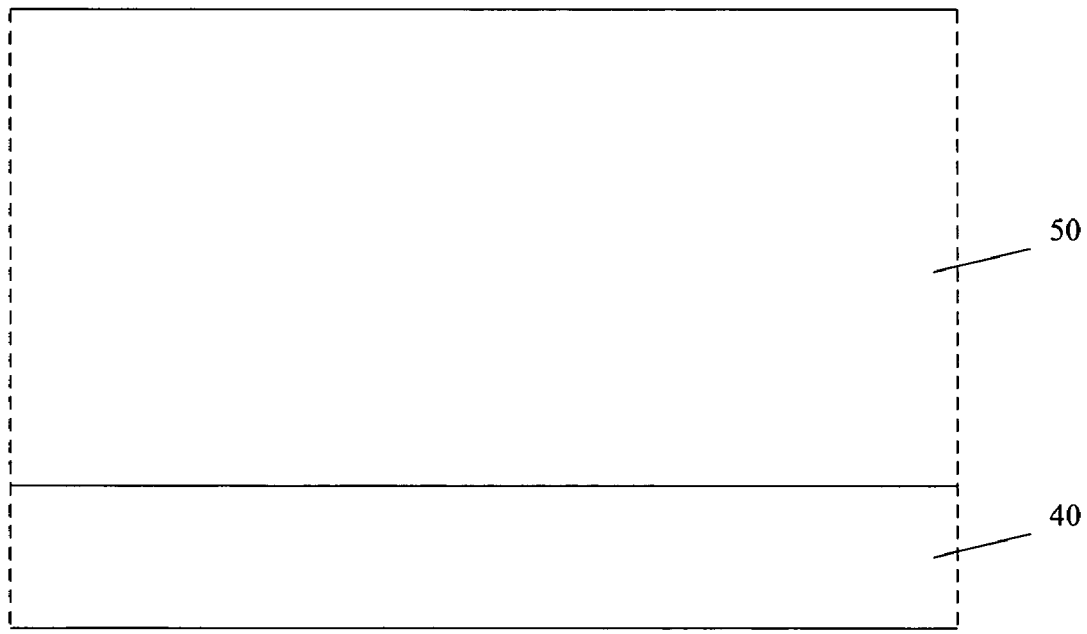

FIG. 3 is a flow diagram outlining a method for forming a modified platinum aluminide coating on a turbine engine component surface. Corresponding coating steps are also visually depicted in FIGS. 4 to 7. As previously discussed, some exemplary turbine engine components for which the method is useful include turbine blades and stators. Such components are commonly made from a superalloy such as a nickel, iron, or cobalt-based metal, to name just a few generic examples. According to the method, a platinum layer 42 is first formed on the turbine engine component surface 40 as step 20. The platinum layer 42 may be formed using one of numerous methods, including electrodeposition, cold spraying, chemical and/or vapor deposition, and plasma spraying.

After forming the platinum layer 42, an electrolyte bath is prepared as step 22. The electrolytic bath is prepared according to the parameters previously discussed with reference to the method outlined in FIG. 1. The bath solvent includes a mixture of primary alcohol and a tertiary alcohol, and further includes an electrolyte such as an yttrium salt, and a buffer as necessary. Alcohols are used as a solvent instead of an aqueous solution for electrodeposition of the active element layer. In an exemplary electrodeposition step, the electrolyte bath is substantially or entirely non-aqueous. Furthermore, excellent yttrium layers are formed when the entire solvent composition in the electrolyte bath consists of a mixture of a primary and a tertiary alcohol. Exemplary primary alcohols in the electrolyte bath include methanol and ethanol, and an exemplary tertiary alcohol is alpha terpineol. Effective electrodeposition of yttrium is obtained using pure ethanol as a primary alcohol, although denatured ethanol that includes some methanol (i.e. 5% methanol) is also suitable. The electrolyte bath for the electrodeposition process has a substantial tertiary alcohol component. An exemplary electrolyte solvent is a tertiary alcohol and a primary alcohol at about a 1:1 volume ratio.

The electrolyte in the bath includes an yttrium salt. Yttrium nitrate is one suitable electrolyte solute, an exemplary solute being $Y(NO_3)_3 \cdot 3H_2O$. The electrolyte is included in the bath solution at least at a 10 mM concentration, and preferably at least at a 100 mM concentration, and more preferably at least at a 200 mM concentration.

After preparing the electrodeposition bath, yttrium is electrodeposited onto the component substrate as step 24 to form an yttrium layer 44. Prior to deposition, the platinum layer 42 or other surfaces of the component 40 may be cleaned using a solvent such as methanol, and prepared by masking areas on which a coating is undesirable using a masking material that is compatible with the alcohol bath. In order to prevent oxidation of the component surface, or oxidation of the active metal being electrodeposited onto the surface, the bath is placed in a controlled and substantially oxygen-free environment at ambient temperature during the electrodeposition process. The bath may be placed into a chamber of an inert gas such as dry nitrogen or argon.

Electrical parameters for electrodeposition of the active material onto the component substrate may be adjusted depending on factors such as the desired coating thickness and the substrate composition. According to an exemplary embodiment, a current of about 2 mA per square inch of component surface area to be coated is applied during electrodeposition, and is maintained for about an hour. To form a modified platinum aluminide coating having a thickness of about 50 μm, yttrium is electrodeposited to a thickness ranging between about 0.4 and about 1.0 μm to obtain a finalized coating having between about 0.2 and about 0.6 weight percent yttrium.

After electrodepositing the active metal, the component is heat annealed to thermally diffuse the active metal into the underlying platinum layer as step 26 to form a modified platinum layer 46. Since yttrium readily oxidizes at room temperature, a brazing adhesive may be used as an oxidation protective coating over the active metal prior to heat annealing the component. If a brazing adhesive or other oxidation protection coating is used, the coating should be selected that will readily vaporize below the diffusion temperature so the coating material does not contaminate the diffusion coating. Furthermore, an exemplary thermal diffusion method is performed under vacuum pressure in order to remove oxygen from the annealing environment.

As previously discussed, in an exemplary method in which yttrium is diffused into the platinum layer, thermal diffusion is performed at a temperature well below 1550° C., which is a eutectic for platinum-yttrium at platinum-rich concentrations. According to one exemplary method, thermal diffusion of yttrium into platinum is performed in a vacuum by maintaining a temperature of about 1065° C. for about four hours.

After diffusing the yttrium into the platinum layer, a layer of aluminum 48 is formed on the modified platinum layer as step 28. The aluminum layer 48 may be formed using one of numerous methods, including cold spraying, various deposition methods including chemical and/or vapor deposition, and plasma spraying. Then, the aluminum is thermally diffused into the modified platinum layer as step 30 to form a modified platinum aluminide coating 50.

For thorough diffusion and distribution of the aluminum, a diffusion temperature should be selected taking into consideration any eutectic points between yttrium and aluminum, and also for aluminum and platinum. In an exemplary method in which aluminum is diffused into the modified platinum layer, thermal diffusion is performed at a temperature well below 1550° C. According to one exemplary method, thermal diffusion of aluminum into the modified platinum layer is performed in a vacuum by maintaining a temperature of about 1065° C. for about four hours.

EXAMPLE

An yttrium electroplating bath was prepared by adding 27.492 grams of $Y(NO_3)_3 \cdot 3H_2O$ and 0.4102 grams of $NaC_2H_3O_2$ to a mixture of 250 mL denatured ethanol (95% ethanol, 5% methanol) and 250 mL of alpha-terpineol. This solution was maintained at a temperature of 50° C. in a closed vessel for four hours to ensure solution of the solid chemicals.

The solution was then cooled to room temperature. A button of superalloy SC-180, one inch in diameter and one-eighth inch thick, was plated with a thin platinum layer, and then held at an elevated temperature in order to cause formation of a diffused layer of the platinum and the superalloy. The button was attached by welding to an electrically conducting wire. The button was placed in the center of the region between two platinum plates, 2.5 inch by 1.5 inch dimension, separated by a one inch spacing. The approximate surface area of the button was 1.96 in$^2$ (12.67 cm$^2$). The assembly and the electroplating solution were placed in an atmosphere-controlled chamber of dry nitrogen gas. The assembly was then placed into the plating solution, and a current source was connected such that the negative lead was attached to the button wire, and the positive lead was attached to both platinum plates.

A current of 2.5 mA was allowed to flow between the two platinum plates and the button for a period of one hour. A gentle stirring was applied to the solution during electroplating by a one-inch square Teflon stirrer rotated at about 100 revolutions per minute. A voltage of about 4.5 volts was required to maintain the current flow in the electroplating cell. A total charge transfer of nine Coulombs is obtained from a flow of 2.5 milliamperes for one hour, and this corresponds to a plated yttrium layer of about 0.5 micrometer thickness on the surface of the button, if a perfect efficiency is assumed in the plating process.

Figure 2:
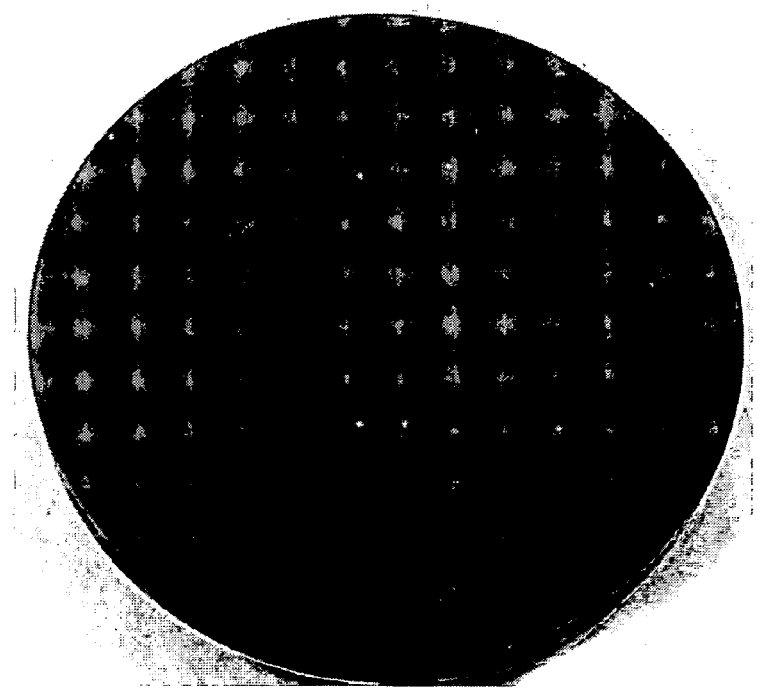
FIG. 2 is a photograph of a superalloy button with diffused yttrium and platinum layers.

After electroplating, the excess solution was washed from the button in a denatured ethanol bath, and the button was dip coated in Nicrobraz 650, a braze adhesive available from Wall Colmonoy Corporation (Madison Heights, Mich.). The coated button was allowed to dry in the controlled atmosphere chamber for four hours, and it was then placed into a vacuum furnace. The furnace temperature was slowly increased to about 600° C. and held there for about fifteen minutes to ensure the complete evaporation of the Nicrobraz coating. The furnace temperature was then increased to 1035° C. and held there for ninety minutes. The furnace was then allowed to cool to room temperature over the course of several hours, and the button was removed from the furnace. FIG. 2 is a photograph of the superalloy button with diffused yttrium and platinum layers. Elemental analysis of a polished cross-section of the button by x-ray fluorescence spectroscopy showed the formation of a diffused layer between the yttrium electroplated layer and the platinum-diffused button.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method for forming an yttrium coating on a metal substrate, the method comprising:
   providing a bath comprising a primary alcohol and a tertiary alcohol, and an electrolyte comprising an yttrium salt; and
   electrodepositing yttrium from the yttrium salt onto the metal substrate.

2. The method according to claim 1, wherein the tertiary alcohol is alpha-terpineol.

3. The method according to claim 1, wherein the primary alcohol is ethanol.

4. The method according to claim 1, wherein the primary alcohol and the tertiary alcohol are included in the bath at a weight ratio of approximately 1:1.

5. The method according to claim 1, wherein the electrolyte comprises yttrium nitrate.

6. The method according to claim 5, wherein the electrolyte comprises $Y(NO_3).3H_2O$.

7. The method according to claim 1, wherein the bath further comprises an anhydrous buffer.

8. The method according to claim 1, further comprising:
   heating the metal substrate after the electrodepositing step to diffuse the yttrium into the metal substrate.

9. A method for forming a modified platinum aluminide coating on a turbine engine component surface, the method comprising:
   forming a platinum layer onto the turbine engine component surface;
   providing a bath comprising a primary alcohol and a tertiary alcohol, and an electrolyte comprising an yttrium salt;
   electrodepositing yttrium from the yttrium salt onto the platinum layer;
   heating the turbine engine component after the electrodepositing step to diffuse the yttrium into the platinum layer to form a modified platinum region;
   depositing aluminum onto the modified platinum layer after the heating step; and
   heating the turbine engine component to diffuse the aluminum into the modified platinum layer to form a modified platinum aluminide region.

10. The method according to claim 9, wherein the tertiary alcohol is alpha-terpineol.

11. The method according to claim 9, wherein the primary alcohol is ethanol.

12. The method according to claim 9, wherein the primary alcohol and the tertiary alcohol are included in the bath at a weight ratio of approximately 1:1.

13. The method according to claim 9, wherein the electrolyte comprises yttrium nitrate.

14. The method according to claim 13, wherein the electrolyte comprises $Y(NO_3).3H_2O$.

15. A method for forming a modified platinum aluminide coating on a turbine engine component surface, the method comprising:
   forming a platinum layer onto the turbine engine component surface;
   heating the turbine engine component to diffuse the platinum layer into the turbine engine component surface;
   providing a bath comprising a primary alcohol and a tertiary alcohol, and an electrolyte comprising an yttrium salt;
   electrodepositing yttrium from the yttrium salt onto the turbine engine component surface having the platinum diffused therein;
   heating the turbine engine component after the electrodepositing step to diffuse the yttrium into the turbine engine component surface to form a modified platinum region;
   depositing aluminum onto the modified platinum layer after the heating step; and
   heating the turbine engine component to diffuse the aluminum into the modified platinum layer to form a modified platinum aluminide region.

16. The method according to claim 15, wherein the tertiary alcohol is alpha-terpineol.

17. The method according to claim 15, wherein the primary alcohol is ethanol.

18. The method according to claim 15, wherein the primary alcohol and the tertiary alcohol are included in the bath at a weight ratio of approximately 1:1.

19. The method according to claim 15, wherein the electrolyte comprises yttrium nitrate.

20. The method according to claim 19, wherein the electrolyte comprises $Y(NO_3).3H_2O$.

* * * * *